Feb. 6, 1951  A. J. BENETEAU  2,540,504
AUTOMOBILE WINDOW SCREEN
Filed April 8, 1949
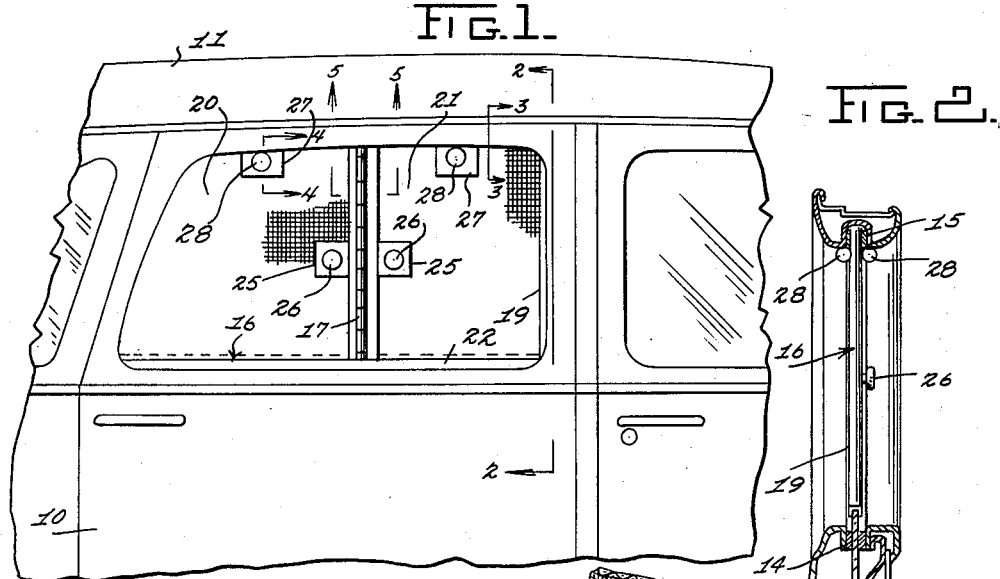
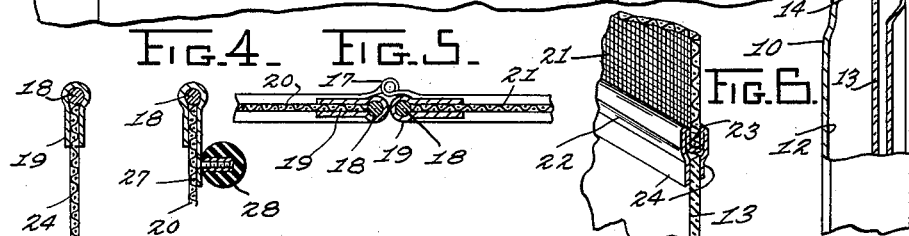
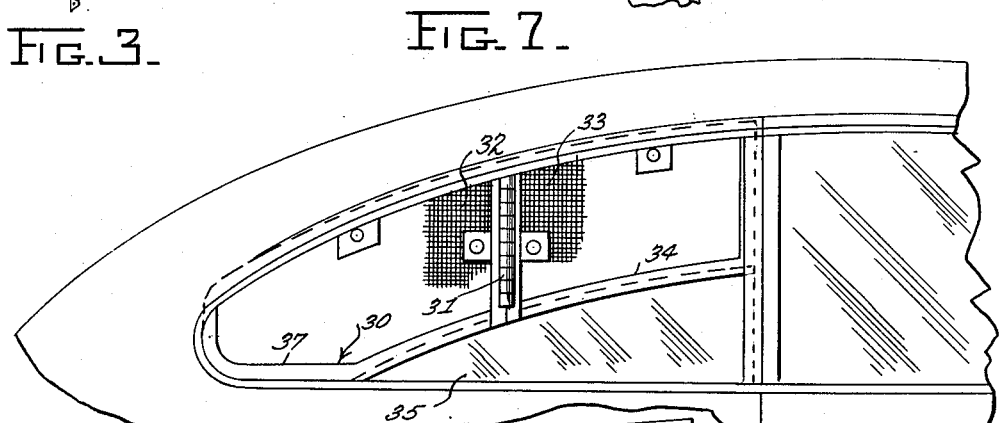
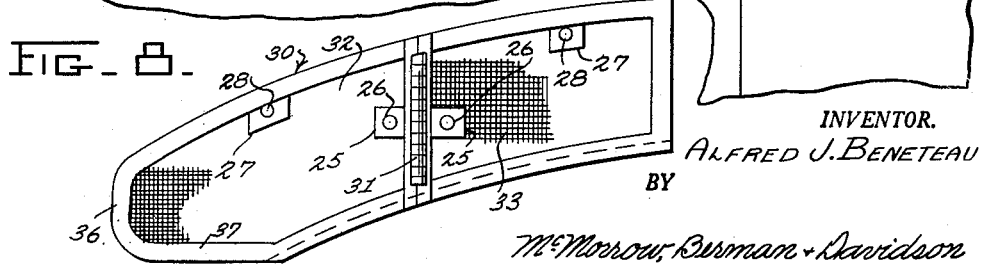
INVENTOR.
ALFRED J. BENETEAU
BY
McMorrow, Berman & Davidson
ATTORNEYS Patented Feb. 6, 1951

2,540,504

UNITED STATES PATENT OFFICE 2,540,504

AUTOMOBILE WINDOW SCREEN

Alfred J. Beneteau, Monroe, Mich.

Application April 8, 1949, Serial No. 86,313

1 Claim. (Cl. 160—229)

This invention relates to window screens, and more particularly to screens for automobile windows, seatable in the window openings by pressure of the window glass against their lower edges.

It is among the objects of the invention to provide a set of window screens for the window openings in the body of an automotive vehicle, which screens are easy to install and remove and are locked in position in the window openings by slightly raising the corresponding window glasses after the screens are placed in the openings with the glasses fully lowered, which will not only preclude the entry of insects and small objects into the vehicle body, but will also provide a safeguard for small children riding in an automobile with the windows open, which are formed in two hingedly, inter-connected parts for ease in handling and storage, provide tight seals with the automobile structure surrounding the window openings therein, and which are simple and durable in construction, economical to manufacture, and neat and attractive in appearance.

Other objects and advantages will become apparent from a consideration of the following description and appended claim in conjunction with the accompanying drawing, wherein:

Figure 1 is a side elevation of a fragmentary portion of an automobile body showing a window screen illustrative of the invention installed in a rear-door window opening of the body;

Figure 2 is a longitudinal cross-section of a fragmentary portion of the automobile rear door taken on the line 2—2 of Figure 1 and showing the screen in edge elevation;

Figure 3 is a transverse cross-section of a fragmentary portion of the screen taken on the line 3—3 of Figure 1;

Figure 4 is a view similar to Figure 3 taken on the line 4—4 of Figure 1;

Figure 5 is a longitudinal cross-section of a fragmentary portion of the screen taken on the line 5—5 of Figure 1;

Figure 6 is a perspective view of a fragmentary lower portion of the screen with the screen and associated window glass shown in transverse cross-section;

Figure 7 is a side elevation of a fragmentary, rear portion of an automobile body showing a window screen illustrative of the invention operatively mounted in the rear window opening of the body; and Figure 8 is an elevation of the window screen illustrated in Figure 7 with such screen completely removed from the window opening in the automobile body.

Although a conventional automobile body has several window openings which vary in size and shape, the same principles are applied in providing a set of screens including respective screens for the various window openings.

With particular reference to the drawing, the screen illustrated in Figures 1 to 6 inclusive, is of a size and shape to fit in the window opening provided in the rear door 10 of the body 11 of a conventional automobile. Below the window opening, the door 10 provides a hollow body 12 which receives the vertically slidable window glass 13 which glass is movable through a glass slot 14 in the door structure along the bottom side of the window opening to close or open the window, vertical movement being imparted to the glass by the usual manually-operated or controlled mechanism, not illustrated. Along the ends and top of the window opening the door structure is provided with a continuous groove or recess 15 which receives the top and end edges of the window glass when the glass is fully raised. Conventionally, the slot 14 and the groove 15 are padded on both sides with suitable resilient material to provide a tight seal between the window glass and the door structure surrounding the window opening when the window is fully raised.

The rear door screen, illustrated in Figures 1 to 6 inclusive, includes a two-part frame, generally indicated at 16, of a size and shape corresponding to the size and shape of the rear door window opening. The two parts of the frame may be of approximately equal size and are connected together along a line which extends transversely of the frame and is substantially vertically disposed when the frame is operatively mounted in the window opening by an elongated pianotype hinge 17.

The frame is formed of suitable sheet metal strips, preferably of a non-corrosive metal, such as aluminum, copper, or stainless steel, and along the end and top edges of the screen the frame comprises a reinforcing wire 18 and a thin metal structure 19 folded along its mid-width location over the wire 18 and brought together to receive the wire mesh screens 20 and 21 therebetween along the marginal portions of the screens. The wire mesh screens are firmly secured to the frame structure 19 by suitable means, such as soldering, brazing, or riveting and are of a width to be received entirely in the window glass receiving grooves in the automobile structure along the top and ends of the window opening, as particularly illustrated in Figures 1 and 2, so that the window opening is not reduced in size by the frame of a screen inserted therein.

The bottom portion 22 of the screen frame, as particularly illustrated in Figure 6, comprises a sheet metal structure which is folded along its mid-width location to provide a U-shaped groove 23 which receives the lower edge portions of the screens 20 and 21, and is then folded back at the opposite sides of the U-shaped groove 23 to provide spaced-apart, substantially parallel side members 24 providing between them a downwardly-opening groove which receives the upper-edge portion of the window glass 13.

Sheet metal plates 25 project outwardly in opposite directions from the respective frame portions joined together by the hinge 17. These plates may be of rectangular or other desired shape, and are firmly secured to the respective screens 20 and 21, and carry respective, outwardly-projecting knobs 26 for handling the screen while it is being inserted into and removed from the window opening.

Respective plates 27 project downwardly from the top portions of the two-part screen at opposite sides of the connecting hinge 17, and are also firmly secured to the wire mesh screens 20 and 21. These plates 27 may be integral extensions of the sheet metal frame structure 19, and they carry respective spherical knobs 28 which bear against the door structure at the top of the window opening to provide limit stops for upward movement of the screen in the window opening.

In order to install the window screen in the window opening, the corresponding window glass 13 is first lowered to its full extent. The screen is then grasped by the knobs 28 and is inserted into the window opening in partly folded condition, with its top edge somewhat below the door structure at the top of the window opening. The screen is then straightened to force its ends into the grooves in the door structure at the ends of the window opening, and the glass 13 is then slightly raised, so that the top edge of the glass enters the groove between the sides 24 of the bottom portion of the screen frame, and the entire screen is slightly raised forcing the top edge of the screen frame into the slot in the door structure at the top of the window opening.

The wire 18 is of a diameter that when surrounded by the sheet metal structure 19 it fits snugly between the resilient padding members in the groove in the door structure at the top and ends of the window opening, and the distance between the sides 24 of the bottom portion of the screen frame is such that these sides closely embrace the upper-edge portion of the window glass 13, so that a tight seal is provided entirely around the screen between the screen and the door structure, and the window glass.

The rear windows and corresponding window glasses of most automobiles are so shaped that when the glass is fully lowered, the rear portion of the glass descends below the body structure at the bottom of the window opening, and the front portion of the glass remains above the body structure at the bottom of the window opening, as is clearly illustrated in Figure 7.

The window screen for the rear window opening has a frame, generally indicated at 30, made in two parts of substantially equal length, which parts are connected together at their adjacent ends by an elongated, piano-type hinge 31 and which extends transversely of the screen and is substantially vertically disposed when the screen is installed in a window opening. The upper portion of the frame 30 is of the same construction as the upper and end portions of the frame 16 of Figure 1, and includes a wire 18 and a sheet metal structure folded at its mid-width location over the wire and providing spaced-apart, opposed sides which receive the wire mesh screens 32 therebetween along the edges of the screens. The frame portion at the top of the rear window screen is curved to closely conform to the curved shape of the upper edge of the window opening, and the bottom portion 34 is curved to conform to the curved top edge of the rear window glass 35.

In this case, the rear end of the screen is sharply curved, as indicated at 36, to fit the sharp curvature at the rear end of the rear window opening, and the top and rear-end portion of the frame is extended from the rear end forwardly along the bottom, as indicated at 37, to cover that portion of the body structure at the bottom of the window which is above the window glass when the glass is lowered, as illustrated in Figure 7. Forwardly from the front end of the frame portion 37 to the front end of the screen the bottom part of the frame has the same construction as illustrated in Figure 6, and described above, to receive the top edge of the window glass.

The rear-window screen has the same kinds of plates 25 at opposite sides of the hinge connection 31, which plates carry respective knobs 26 for handling the screen, and plates 27 project downwardly from the top part of the frame to carry the stop bumpers 28, as described above.

The rear-window screen is installed in the same manner as the front-window screen with the exception that, because of the downwardly-and-rearwardly-curved, or tapered top edge of the rear-window opening the window screen will be firmly seated in the window opening when it is straightened in position, and it is necessary to raise the window glass only to engage in the window-glass-receiving slot in the bottom portion of the screen frame, and not necessary to raise the entire frame, and particularly the rear-end portion of the screen.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A window screen for an automobile window comprising a two part metal frame having a shape and size corresponding to the shape and size of a window opening in which the screen is to be used, an elongated hinge joint interconnecting the two parts of said frame, and wire mesh screens marginally secured one in each part of said frame, each of said frame parts comprising top and end portions including a reinforcing wire extending along the corresponding edges of said screens and a sheet metal strip medially folded over said wire to provide a wire receiving bead and opposed wing portions disposed at respectively opposite sides of the marginal portions of the corresponding screens and secured thereto, a bottom portion including a sheet metal strip providing wings disposed at respectively opposite sides of the adjacent marginal portion of the corresponding screen and secured thereto and parallel sides extending away from the last mentioned wings to provide therebetween a groove for the reception of the upper edge of a window glass therein, the top and end portions of said frame having a width such that said portions are entirely received in the glass receiving groove of an automobile window in which said screen is mounted, and stop bumpers secured one to the top portion of each frame part and disposed adjacent the inner edge of the corresponding frame part to engage the upper surface of an automobile window opening and limit movement of the upper portion of the frame part into the upper portion of the glass receiving groove of an automobile window in which the screen is mounted.

ALFRED J. BENETEAU.

REFERENCES CITED

The following references are of record in the file of this patent:

UNITED STATES PATENTS

| Number | Name | Date |
| --- | --- | --- |
| 1,579,583 | Wallan | Apr. 6, 1926 |
| 1,619,501 | Evans | Mar. 1, 1927 |
| 1,627,760 | Wood | May 10, 1927 |
| 1,741,890 | Turner | Dec. 31, 1929 |
| 1,906,237 | Pousha et al. | May 2, 1933 |